United States Patent
Aist et al.

(10) Patent No.: US 10,701,180 B2
(45) Date of Patent: Jun. 30, 2020

(54) NAVIGATION SYSTEM WITH CONTENT DELIVERY MECHANISM AND METHOD OF OPERATION THEREOF

(71) Applicant: Telenav, Inc., Santa Clara, CA (US)

(72) Inventors: Gregory Stewart Aist, Santa Clara, CA (US); Aliasgar Mumtaz Husain, Milpitas, CA (US); Casey Carter, Sunnyvale, CA (US); Shalu Grover, Sunnyvale, CA (US); Naveen Kumar Vandanapu, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 424 days.

(21) Appl. No.: 15/382,250

(22) Filed: Dec. 16, 2016

(65) Prior Publication Data

US 2018/0176332 A1 Jun. 21, 2018

(51) Int. Cl.
*H04L 29/08* (2006.01)
*H04W 4/029* (2018.01)
*H04W 4/024* (2018.01)

(52) U.S. Cl.
CPC ........ *H04L 67/327* (2013.01); *H04L 67/2804* (2013.01); *H04L 67/306* (2013.01); *H04W 4/024* (2018.02); *H04W 4/029* (2018.02); *H04L 67/18* (2013.01)

(58) Field of Classification Search
CPC ... H04L 67/327; H04L 65/4069; H04L 67/18; H04W 4/024

USPC .......................................................... 701/456
See application file for complete search history.

(56) References Cited

U.S. PATENT DOCUMENTS

| | | | | |
|---|---|---|---|---|
| 2008/0129528 | A1* | 6/2008 | Guthrie | G09B 5/062 340/686.1 |
| 2009/0113305 | A1* | 4/2009 | Graif | G06F 16/9537 715/727 |
| 2010/0217525 | A1* | 8/2010 | King | G06Q 30/02 701/300 |
| 2018/0176332 | A1* | 6/2018 | Aist | H04W 4/029 |

* cited by examiner

*Primary Examiner* — Thomas G Black
*Assistant Examiner* — Wae L Louie
(74) *Attorney, Agent, or Firm* — Perspectives Law Group, Corp.

(57) ABSTRACT

A method of operation of a navigation system includes: determining a travel context with a control unit based on a context factor; generating a content metadata based on extracting a corresponding instance of the context factor from a media content; generating a delivery content based on the travel context, the content metadata, or a combination thereof for selecting the media content relevant to the travel context; and generating multiple instances of a delivery sequence wherein each of the delivery sequence different from one another by including a different instance of the delivery content for tailoring the delivery sequence for each of a user profile traveling together within the travel context for presenting on each of a device of the user profile.

20 Claims, 6 Drawing Sheets

NAVIGATION SYSTEM WITH CONTENT DELIVERY MECHANISM AND METHOD OF OPERATION THEREOF

TECHNICAL FIELD

The present invention relates generally to a navigation system, and more particularly to a system with content delivery mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving content delivery mechanism to control a device during operation of vehicle has become a paramount concern for the consumer. The inability decreases the benefit of using the tool.

Thus, a need still remains for a navigation system with content delivery mechanism to a device during operation of vehicle. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel context with a control unit based on a context factor; generating a content metadata based on extracting a corresponding instance of the context factor from a media content; generating a delivery content based on the travel context, the content metadata, or a combination thereof for selecting the media content relevant to the travel context; and generating multiple instances of a delivery sequence wherein each of the delivery sequence different from one another by including a different instance of the delivery content for tailoring the delivery sequence for each of a user profile traveling together within the travel context for presenting on each of a device of the user profile.

The present invention provides a navigation system, including: a control unit for: determining a travel context with a control unit based on a context factor, generating a content metadata based on extracting a corresponding instance of the context factor from a media content, generating a delivery content based on the travel context, the content metadata, or a combination thereof for selecting the media content relevant to the travel context, generating multiple instances of a delivery sequence wherein each of the delivery sequence different from one another by including a different instance of the delivery content for tailoring the delivery sequence for each of a user profile traveling together within the travel context; and a communication unit, coupled to the control unit, for transmitting the multiple instances of a delivery sequence for presenting on each of a device of the user profile.

The present invention provides a navigation system having a non-transitory computer readable medium including instructions for execution, the instructions comprising: determining a travel context based on a context factor; generating a content metadata based on extracting a corresponding instance of the context factor from a media content; generating a delivery content based on the travel context, the content metadata, or a combination thereof for selecting the media content relevant to the travel context; and generating multiple instances of a delivery sequence wherein each of the delivery sequence different from one another by including a different instance of the delivery content for tailoring the delivery sequence for each of a user profile traveling together within the travel context for presenting on each of a device of the user profile.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
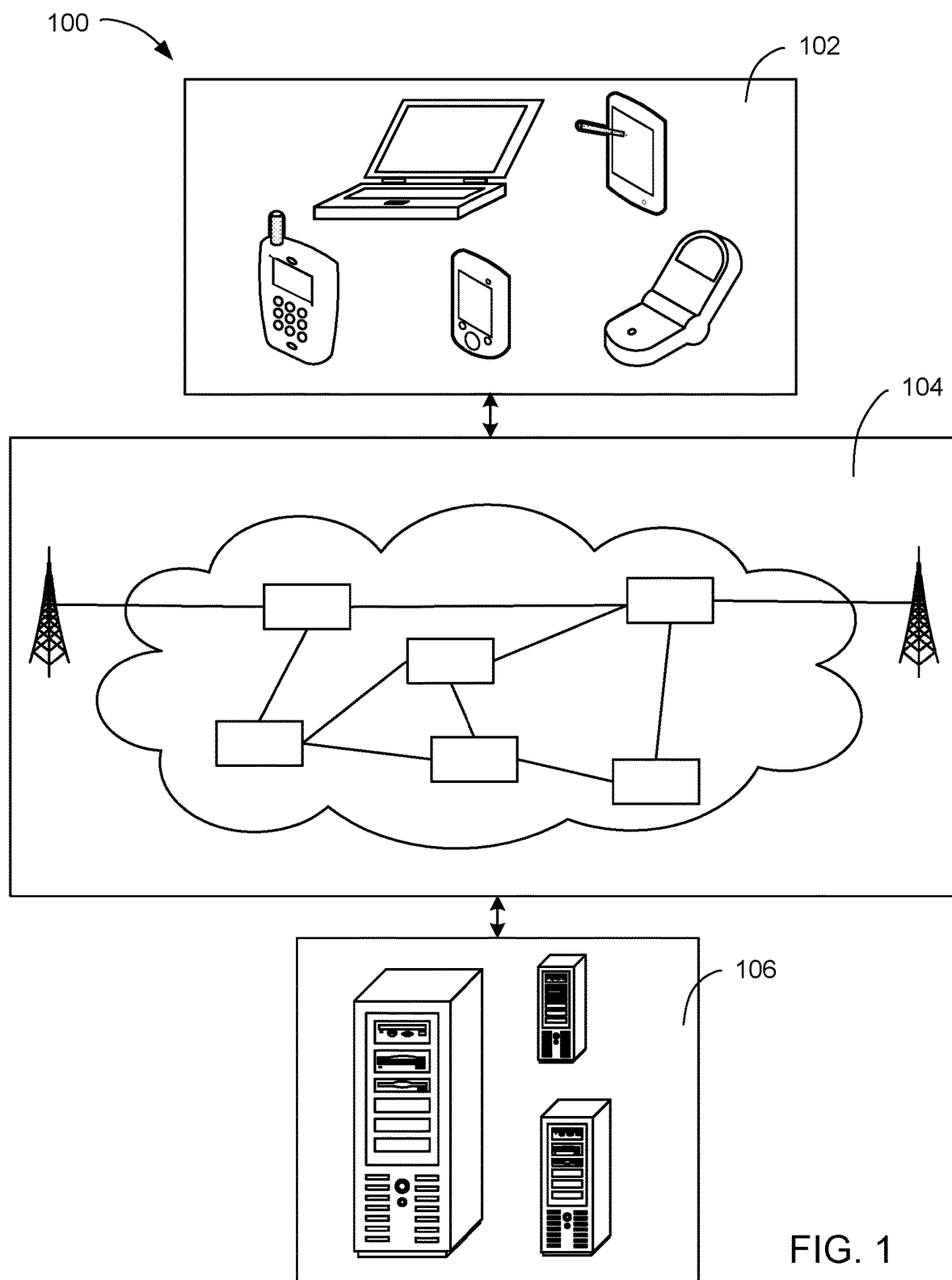
FIG. 1 is a navigation system with content delivery mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component. In a further embodiment of the present invention, the navigation information also includes altitude as part of location information.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with content delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
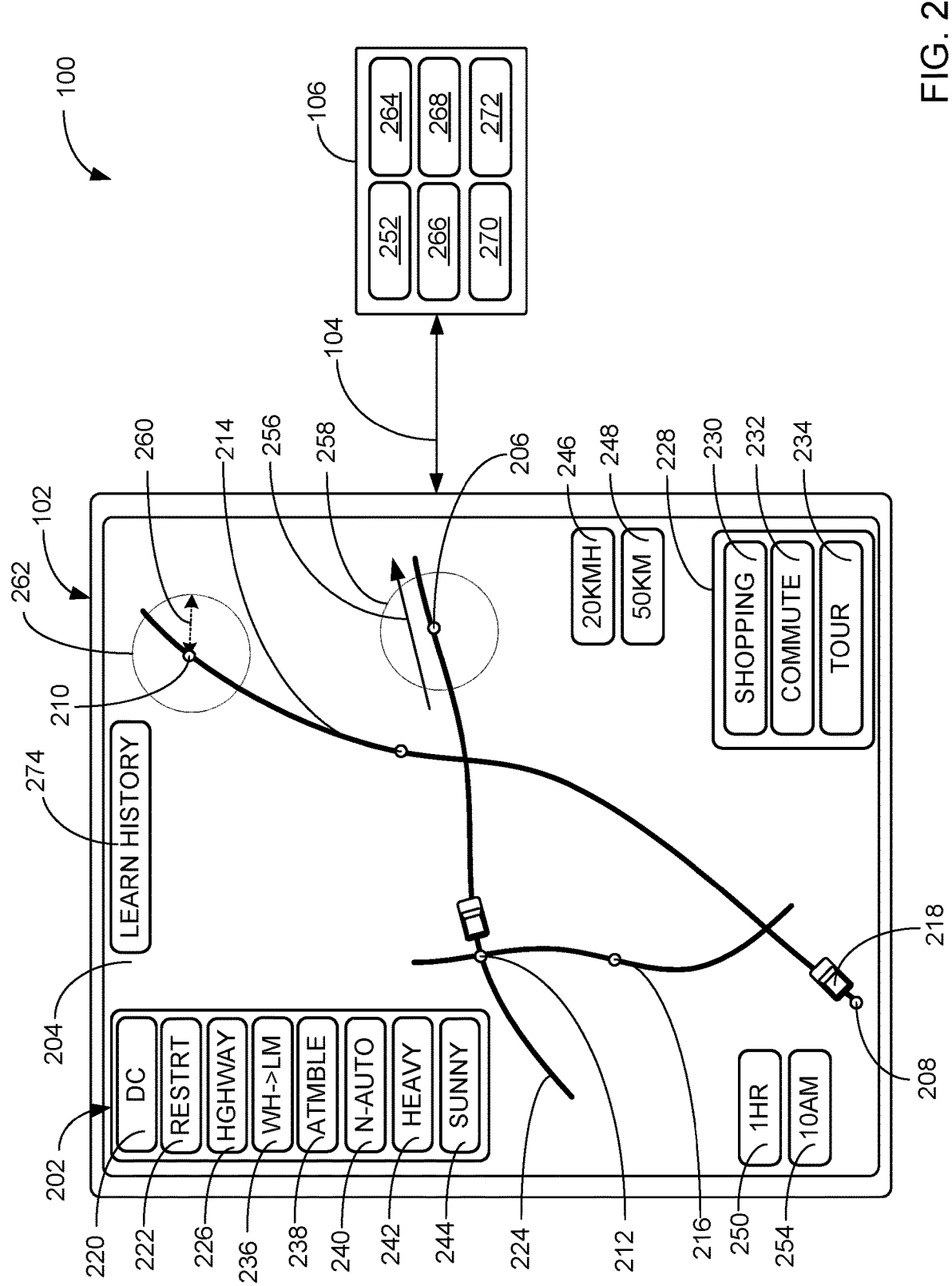
FIG. 2 is an example of information considered by the navigation system.

Referring now to FIG. 2, there is shown an example of information considered by the navigation system 100. For clarity and brevity, the discussion of the embodiment of the present invention will focus on the first device 102 delivering the result generated by the navigation system 100. However, the second device 106 and the first device 102 can be discussed interchangeably. The first device 102 and the second device 106 can communicate via the communication path 104.

A context factor 202 is defined as data considered by the navigation system 100 to determine a travel context 204. The travel context 204 is defined as a situation or circumstance surrounding the first device 102. For example, the travel context 204 can represent the circumstance surrounding the user with first device 102 while traveling to a geographic location 206.

The context factor 202 can include the geographic location 206. The geographic location 206 is defined as a physical location. For example, the geographic location 206 can include a home location 208, a work location 210, a start location 212, a target destination 214, a point of interest 216, a current location 218, or a combination thereof.

The home location 208 is defined as a physical location representing the user's home. The work location 210 is defined as a physical location representing the user's work place. The start location 212 is defined as a physical location where the user's travel starts. The target destination 214 is defined as a physical location where the user's travel ends. The point of interest 216 is defined as a physical location where is user has interest in visiting. For example, the point of interest 216 can represent the target destination 214.

The current location 218 is defined as a physical location of the first device 102 detected in real time. Real time can represent a time frame of current time, happening at this moment, immediately after an execution of a process by the first device 102, the second device 106, or a combination thereof. For example, the current location 218 of the first device 102 can be tracked in real time to determine the geographic location 206 of the first device 102 within a geographic area 220. Moreover, dynamically can represent a continuous change in a situation. For example, the travel context 204 can change dynamically as the user of the first device 102 travels from one of the geographic location 206 to another instance of the geographic location 206.

The context factor 202 can include the geographic area 220, which is defined as a geographic region. For example, the geographic area 220 can represent the geographic region traveled by the user of the first device 102 to visit the geographic location 206. Multiple instances of the geographic location 206 can locate within the geographic area 220. The context factor 202 can include a category of interest 222, which is defined as a classification of an interest. For example, the category of interest 222 of the point of interest 216 can include a restaurant, shopping mall, school, government entity, tourist spot, park, or a combination thereof. For another example, the category of interest 222 can represent the user's preference in music during the user's travel.

The context factor 202 can include a road segment 224, which is defined as a travel path taken to travel from one of the geographic location 206 to another of the geographic location 206. The context factor 202 can include a road class 226, which is a classification of the road segment 224. For example, the road class 226 can include a trail, dirt road, residential road, arterial road, expressway, highway, freeway, tolled road, or a combination thereof.

The context factor 202 can include a travel type 228, which is defined as a classification or a user's travel. For example, the travel type 228 can include a personal travel 230, a work travel 232, a tour travel 234, or a combination thereof. The personal travel 230 is defined as the user's travel for personal reason. For example, the personal travel 230 can include traveling to the point of interest 216 to shop for grocery.

The work travel 232 is defined as the user's travel for professional reason. For example, the work travel 232 can include commuting to the work, flying on a business trip, or a combination thereof. The tour travel 234 is defined as a participation on a third party arranged travel. For example, the tour travel 234 can include a cruise tour in a Mediterranean Sea to stop at different locations of the point of interest 216. A travel itinerary 236 is defined as a plan for user's travel. For example, the travel itinerary 236 can include multiple locations of the point of interest 216 planned to be travel by the user. The personal travel 230, the work travel 232, the tour travel 234, or a combination thereof can include the travel itinerary 236.

The context factor 202 can include a travel mode 238, which is defined as user's method to travel. For example, the travel mode 238 can include walking, jogging, running, by bicycle, by sailing, by motorcycle, by flying on an airplane, by public transportation, by driving or riding a non-autonomous vehicle, by riding an autonomous vehicle, or a combination thereof. The context factor 202 can include a vehicle type 240, which is defined as a classification of a vehicle. For example, the vehicle type 240 can include the non-autonomous vehicle, autonomous vehicle, gasoline powered vehicle, hybrid vehicle, electric vehicle, hydrogen powered vehicle, or a combination thereof.

The context factor 202 can include a traffic condition 242. The traffic condition 242 is defined as a severity of traffic congestion. The traffic condition 242 can include standstill, heavy, moderate, light, or free flow. The context factor 202 can include a weather condition 244. The weather condition 244 is defined as a state of the atmosphere with respect to wind, temperature, cloudiness, moisture, pressure, or a combination thereof. The weather condition 244 can include sunny, cloudy, rainy, foggy, windy, stormy, cold, mild, hot, hail, snow, or a combination thereof.

The context factor 202 can include a travel speed 246. The travel speed 246 is defined as a time rate of change of position. For example, the travel speed 246 of the user with first device 102 operating the vehicle type 240 of an autonomous vehicle can represent 100 kilometers per hour. The context factor 202 can include a travel distance 248. The travel distance 248 is defined as a physical distance of a travel. For example, the travel distance 248 can represent the physical distance between one of the geographic location 206 and another of the geographic location 206 traveled or to be traveled.

The context factor 202 can include a travel time 250. The travel time 250 is defined as duration required for a travel. For example, the travel time 250 between one instance of the geographic location 206 and another instance of the geographic location 206 can represent one hour. A remaining time threshold 252 is defined as a limit on a time duration required to reach the geographic location 206. For example, the remaining time threshold 252 can represent maximum or minimum time duration. The context factor 202 can include a time of travel 254. The time of travel 254 is defined as a timeframe of when travel occurred. For example, the time of travel 254 can include a time of day, week, month, year, season, or a combination thereof.

The context factor 202 can include a pass by 256. The pass by 256 is defined as a situation or circumstance where a person with the first device 102 travels past by the geographic location 206 rather than stopping at the geographic location 206. For example, the user of the first device 102 can perform the pass by 256 by traveling past the point of interest 216 representing a gas station rather than stopping at the gas station to refuel the non-autonomous vehicle.

The context factor 202 can include a geographic proximity 258. The geographic proximity 258 is defined as closeness from the geographic location 206. For example, the navigation system 100 can determine the geographic proximity 258 based on a predefined distance 260 from the geographic location 206. The predefined distance 260 is a set physical distance. For example, the predefined distance 260 can represent 50 meters. If the current location 218 is detected within 50 meters from the geographic location 206, the navigation system 100 can determine the current location 218 to be within the geographic proximity 258 of the geographic location 206.

The context factor 202 can include an event proximity 262. The event proximity 262 is defined as closeness from the geographic location 206 with the category of interest 222 of an event. The event is defined as an organized occasion. For example, the event can include music event, sports event, social event, or a combination thereof. For further example, the navigation system 100 can determine the event proximity 262 based on the predefined distance 260 from the event. For example, the predefined distance 260 can represent 50 meters. If the current location 218 is detected within 50 meters from the geographic location 206, the navigation system 100 can determine the current location 218 to be within the event proximity 262 of the geographic location 206.

A population threshold 264 is defined as a limit on number of people within the geographic area 220. The population threshold 264 can represent a maximum or minimum population. For example, if the population of the geographic area 220 meets or exceeds the population threshold 264, the geographic area 220 can represent an urban area. If the population of the geographic area 220 is below the population threshold 264, the geographic area 220 can represent a rural area.

The context factor 202 can include an activity history 266. The activity history 266 is defined as user's activity record. For example, the activity history 266 can represent the user's travel record within the geographic area 220. For another example, the activity history 266 can represent the user's access log to the navigation system 100.

The context factor 202 can include a safety level 268. The safety level 268 is defined as a measure of physical harm posed to a person. A safety threshold 270 is defined as a limit on the safety level 268. For example, the safety threshold 270 can represent maximum or minimum level of the safety level 268. For further example, if the safety level 268 meets or exceeds the safety threshold 270, the safety level 268 can be considered safe. In contrast, if the safety level 268 is below the safety threshold 270, the safety level 268 can be considered dangerous. The safety level 268 can be represented in a range of alphanumeric values. For example, the safety level 268 can range from 0 to 10 where 0 can represent critically dangerous and 10 can represent complete safety.

The context factor 202 can include a user profile 272. The user profile 272 is defined as personal information of a person. For example, the user profile 272 for the user of the first device 102 can include the user's name, sex, gender, profession, preference in the category of interest 222, or a combination thereof. The context factor 202 can include a travel goal 274. The travel goal 274 is defined as a purpose of the travel. For example, the travel goal 274 can include visiting for Grandmother's birthday the personal travel 230.

Figure 3:
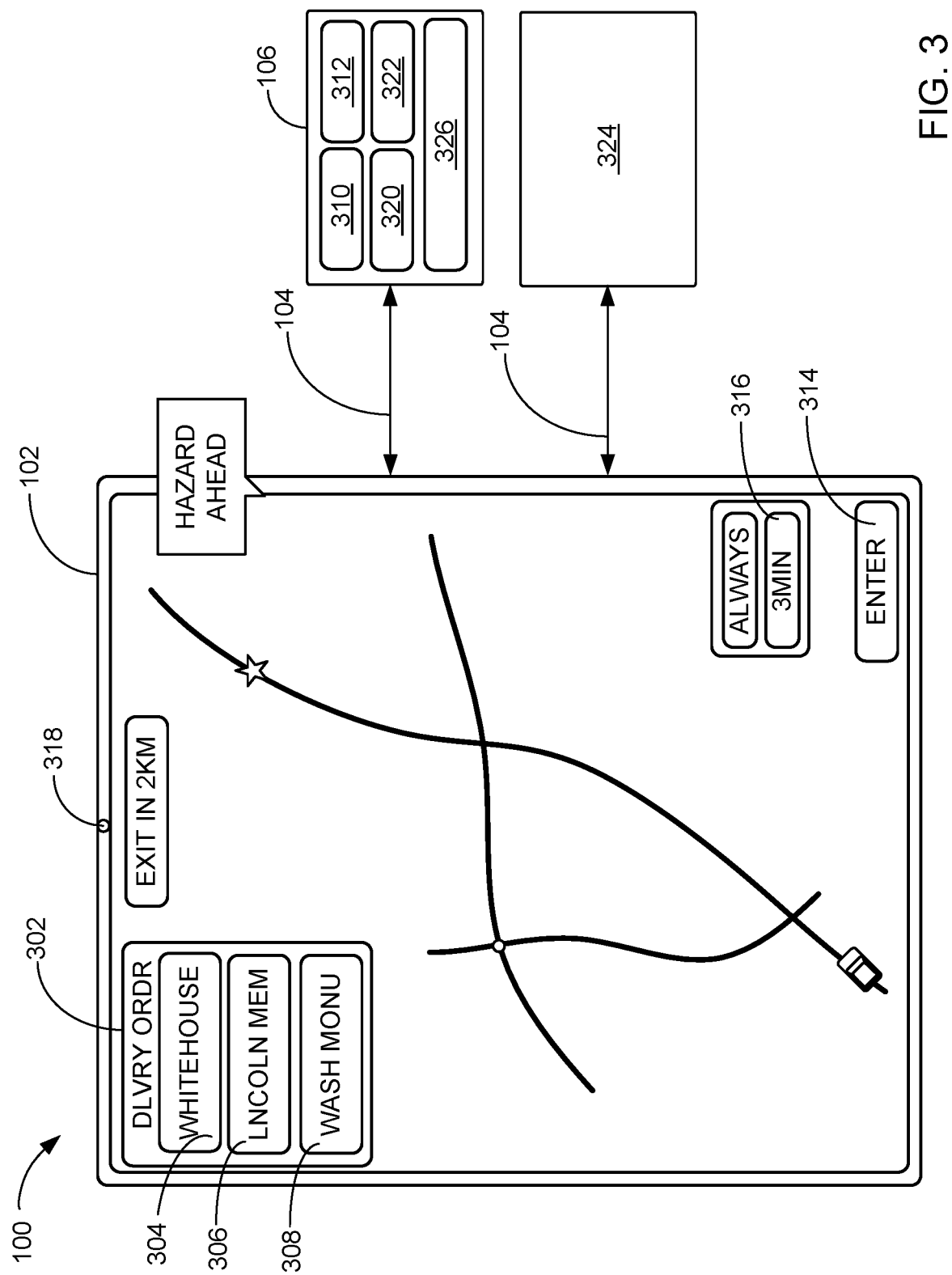
FIG. 3 is an example of presenting a delivery sequence including a delivery content.

Referring now to FIG. 3, there is shown an example of presenting a delivery sequence 302 including a delivery content 304. The first device 102 and the second device 106 can communicate via the communication path 104. The delivery sequence 302 is defined as an arrangement of delivering the delivery content 304. For example, the delivery sequence 302 can represent an order of how the delivery content 304 can be presented to the user of the first device 102. The delivery content 304 is defined as information to be presented to the first device 102. For example, the delivery content 304 can include an audio content, a visual content, a tactile content, an advertisement, a coupon, or a combination thereof for the user of the first device 102 to access.

The delivery content 304 can include a primary content 306, a secondary content 308, or a combination thereof. The primary content 306 can include information with highest relevancy that meets the user's interest, to the travel context 204 of FIG. 2, or a combination thereof. The secondary content 308 can include information presented to adjust the delivery sequence 302, to supplement the primary content 306, or a combination thereof.

A media content 310 is defined as source information used to generate the delivery content 304. For example, the media content 310 can include an audio content, a visual content, or a combination thereof. A content metadata 312 is defined as a component within information extracted or generated to generate the delivery content 304. For example, the content metadata 312 can include alphanumeric information, a user entry 314, or a combination thereof. More specifically as an example, the content metadata 312 can represent a word within the media content 310 representing lyrics of a song. For another example, the content metadata 312 can present the user entry 314 such as "like" to a particular video content. A content duration 316 is defined as a time length of the information. For example, the content duration 316 can represent the time length of the delivery content 304, the media content 310, or a combination thereof.

The user entry 314 is defined as information provided by the user. For example, the user entry 314 can represent information provided explicitly or implicitly by the user of the first device 102. For example, the explicit instance of the user entry 314 can include making a selection on the first device 102. In contrast, the implicit instance of the user entry 314 can include information captured from the user by a capturing device 318.

The capturing device 318 can capture, track, monitor, detect, or a combination thereof the user of the first device 102 or surrounding of the user of the first device 102. For example, the capturing device 318 can include a digital camera, video camera, thermal camera, night vision camera, infrared camera, x-ray camera, ultraviolet camera, or the combination thereof.

The delivery sequence 302 can include an itinerary-centric sequence 320, a goal-centered sequence 322, or a combination thereof. The itinerary-centric sequence 320 is defined as the delivery sequence 302 organized according to the travel itinerary 236 of FIG. 2. The goal-centered sequence 322 is defined as the delivery sequence 302 organized according to the travel goal 274 of FIG. 2.

An external source 324 can represent a source of information. For example, the external source 324 can include third party information provider including a government entity, a third party information provider such as a media outlet and/or a website, other users of the navigation system 100, or a combination thereof. The first device 102, the second device 106, or a combination thereof can communicate with the external source 324 via the communication path 104.

A map data 326 is defined as geographic information. For example, the external source 324 such as OpenStreetMap.org can provide the map data 326 for the navigation system 100 to consider for generating the result for the user of the first device 102. The map data 326 can include the geographic location 206 of FIG. 2, the geographic area 220 of FIG. 2, the point of interest 216 of FIG. 2, the category of interest 222 of FIG. 2, the road segment 224 of FIG. 2, or a combination thereof.

Figure 4:
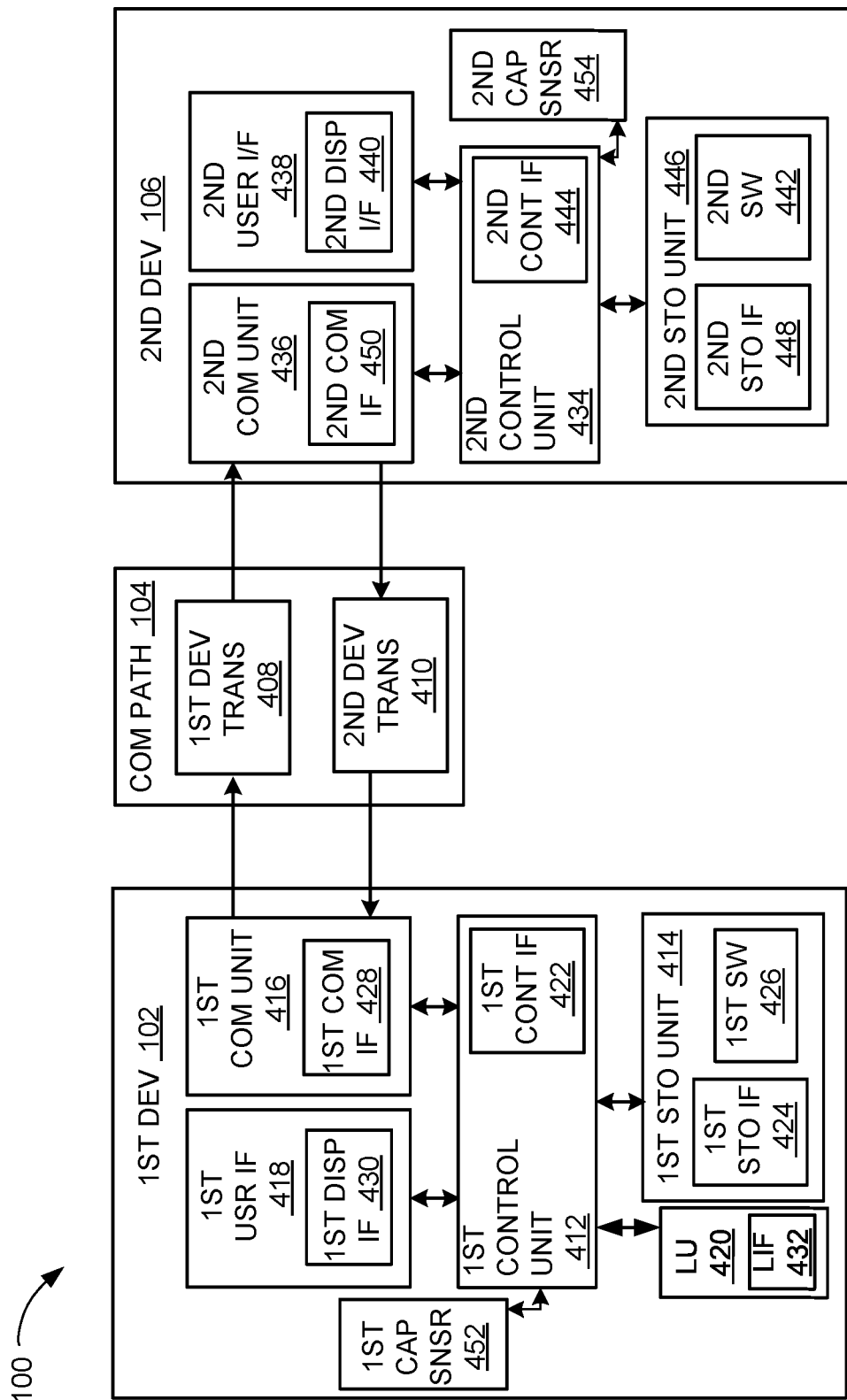
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

A first capturing sensor 452 can represent the capturing device 222 of FIG. 2. Examples of the first capturing sensor 452 can include a digital camera, video camera, thermal camera, night vision camera, infrared camera, x-ray camera, ultraviolet camera, or the combination thereof. Examples of the first capturing sensor 452 can further include accelerometer, thermometer, microphone, wireless signal receiver, remote physiological monitoring device, light identifier, or the combination thereof.

A second capturing sensor 454 can represent the capturing device 222. Examples of the second capturing sensor 454 can include a digital camera, video camera, thermal camera, night vision camera, infrared camera, x-ray camera, ultraviolet camera, or the combination thereof. Examples of the second capturing sensor 454 can further include accelerometer, thermometer, microphone, wireless signal receiver, remote physiological monitoring device, light identifier, or the combination thereof.

Figure 5:
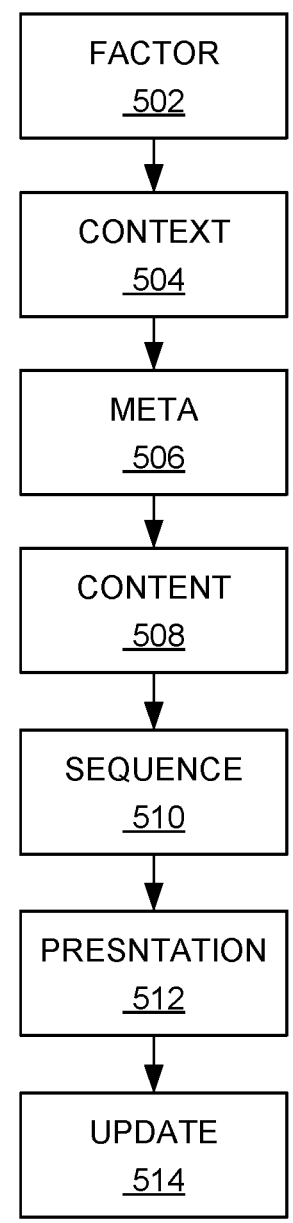
FIG. 5 is a control flow of the navigation system.

Referring now to FIG. 5, therein is shown a control flow of the navigation system 100. The navigation system 100 can include a factor module 502. The factor module 502 determines the context factor 202 of FIG. 2. For example, the factor module 502 can determine various instances of the context factor 202.

The factor module 502 can determine the context factor 202 in a number of ways. The factor module 502 can determine the context factor 202 representing the geographic location 206 of FIG. 2. For example, the factor module 502 can determine the various types of the geographic location 206 including the current location 218 of FIG. 2, the home location 208 of FIG. 2, the work location 210 of FIG. 2, the start location 212 of FIG. 2, the target destination 214 of FIG. 2, the point of interest 216 of FIG. 2, or a combination thereof. More specifically as an example, the factor module 502 can determine the geographic location 206 based on the location unit 420 of FIG. 4, the user entry 314 of FIG. 3, the travel itinerary 236 of FIG. 2, or a combination thereof.

For a specific example, the factor module 502 can determine the current location 218 based on the GPS coordinates of the first device 102 of FIG. 1 detected by the location unit 420. For a different example, the factor module 502 can determine the home location 208, the work location 210, or a combination thereof based on the user entry 314 made to the navigation system 100. For another example, the factor module 502 can determine the start location 212, the target destination 214, the point of interest 216, or a combination thereof based on as indicated in the travel itinerary 236 stored in the first storage unit 414 of FIG. 4, the second storage unit 446 of FIG. 4, or a combination thereof.

The factor module 502 can determine the context factor 202 representing the geographic area 220 of FIG. 2. For example, the factor module 502 can determine the geographic area 220 based on the geographic location 206, the map data 326 of FIG. 3, the user entry 314, the travel itinerary 236, or a combination thereof. As discussed above, the geographic location 206 representing the current location 218 can be detected by the location unit 420. Based on the current location 218 detected, the factor module 502 can determine the geographic area 220 traveled by the user with the first device 102 by comparing the current location 218 to the map data 326 stored in the first storage unit 414, the second storage unit 446, or a combination thereof. The map data 326 can indicate the geographic area 220 where the GPS coordinate of the current location 218 is detected. For a different example, the factor module 502 can determine the geographic area 220 based on as indicated by the user entry 314, the travel itinerary 236, or a combination thereof.

For further example, the factor module 502 can determine the geographic area 220 based on the map data 326. More specifically as an example, the map data 326 can include the population information to indicate whether geographic area 220 is urban or rural. For example, the factor module 502 can determine the geographic area 220 to represent the urban area based on the population within the geographic area 220 meets or exceeds the population threshold 264 of FIG. 2. In contrast, the factor module 502 can determine the geographic area 220 to represent the rural area based on the population within the geographic area 220 is below the population threshold 264. For a different example, the factor module 502 can determine the geographic area 220 to represent the boundary established by the neighborhood, town, city, county, state, prefecture, country, or a combination thereof as indicated in the map data 326.

The factor module 502 can determine the context factor 202 including the pass by 256 of FIG. 2, the geographic proximity 258 of FIG. 2, the event proximity 262 of FIG. 2, or a combination thereof. For a specific example, the factor module 502 can determine the pass by 256 based on the current location 218, the travel speed 246 of FIG. 2, the point of interest 216, or a combination thereof. More specifically as an example, the factor module 502 can track the change in the current location 218 based on the travel speed 246 traveling from one instance of the geographic location 206 to another instance of the geographic location 206. Moreover, the factor module 502 can determine that the pass by 256 had occurred based on the change in the current location 218 traveling at the travel speed 246 within the predefined distance 260 of FIG. 2 from the geographic location 206 such as the point of interest 216 and exiting from the predefined distance 260 without stopping at the point of interest 216.

For a different example, the factor module 502 can determine that the current location 218 is within the geographic proximity 258 based on detecting the current location 218 within the predefined distance 260 from the geographic location 206 such as the point of interest 216. For further example, the factor module 502 can determine that the current location 218 is within the event proximity 262 based on detecting the current location 218 within the predefined distance 260 from the geographic location 206 holding an event.

The factor module 502 can determine the context factor 202 representing the road class 226 of FIG. 2 based on the geographic location 206, the map data 326, or a combination thereof. For example, the factor module 502 can determine the road class 226 based on comparing the road segment 224 of FIG. 2 where the current location 218 is detected to the map data 326. More specifically as an example, the map data 326 can indicate that the road class 226 of the road segment 224 where the current location 218 is detected can represent the freeway.

The factor module 502 can determine the context factor 202 representing the traffic condition 242 of FIG. 2. For example, the factor module 502 can determine the traffic condition 242 of the geographic location 206, the geographic area 220, the road segment 224, or a combination thereof. More specifically as an example, the factor module 502 can determine the traffic condition 242 based on receiving the traffic information from the external source 324 of FIG. 3 including a government entity, a third party information provider such as a media outlet, other users of the navigation system 100, or a combination thereof. As a result, the factor module 502 can determine whether the traffic condition 242 is standstill, heavy, moderate, free flow, or a combination thereof.

The factor module 502 can determine the context factor 202 representing the travel type 228 of FIG. 2. For example, the factor module 502 can determine the travel type 228 including the personal travel 230 of FIG. 2, the work travel 232 of FIG. 2, the tour travel 234 of FIG. 2, or a combination thereof. More specifically as an example, the factor module 502 can determine the personal travel 230, the work travel 232, the tour travel 234, or a combination thereof based on the time of travel 254 of FIG. 2, the geographic location 206, the geographic area 220, the travel itinerary 236, the user entry 314, the activity history 266 of FIG. 2, the travel goal 274 of FIG. 2, or a combination thereof.

For a specific example, the factor module 502 can determine the personal travel 230 based on the target destination 214 representing a shopping mall at the time of travel 254 representing on a weekend. For a different example, the factor module 502 can determine the work travel 232 based on the target destination 214 representing the user's workplace and the activity history 266 indicating that the user leaves for work around 8 am on the time of travel 254 representing the weekday.

For another example, the factor module 502 can determine the tour travel 234 based on multiple instances of the geographic location 206 scheduled to be visited on the travel itinerary 236. More specifically as an example, the category of interest 222 of FIG. 2 of each of the point of interest 216 scheduled for a stop can represent famous tourist stop within the geographic area 220. For a different example, the user entry 314 can indicate that the travel goal 274 is to visit the zoo. As a result, the factor module 502 can determine the travel goal 274 to represent the personal travel 230 to visit the zoo.

The factor module 502 can determine the context factor 202 representing the travel mode 238 of FIG. 2. For example, the factor module 502 can determine the travel mode 238 based on the travel speed 246, the road segment 224, the geographic area 220, the geographic location 206, the user entry 314, or a combination thereof. More specifically as an example, the factor module 502 can determine the travel mode 238 to represent a travel by walking based on the travel speed 246 within a standard deviation for an average walking speed by a human. For a different example, the factor module 502 can determine the travel mode 238 to represent a travel by vehicle based on the travel speed 246 meeting or exceeding the speed limit for the road segment 224. For further example, the factor module 502 can determine the travel mode 238 including the vehicle type 240 of FIG. 2. The factor module 502 can determine the vehicle type 240 based on the user entry 314 of whether the vehicle type 240 represents the autonomous vehicle or non-autonomous vehicle.

The factor module 502 can determine the context factor 202 representing the time of travel 254. For example, the factor module 502 can determine the time of travel 254 based on the time of day, week, month, year, season, or a combination thereof. For further example, the factor module 502 can determine the time of travel 254 when the user with the first device 102 departs the start location 212 or arrives at the target destination 214. For another example, the factor module 502 can determine the time of travel 254 based on the activity history 266 of the user's travel in the past to extrapolate that the user will go on a specific instance of the travel type 228 at the given instance of the time of travel 254.

The factor module 502 can determine the context factor 202 representing the weather condition 244 of FIG. 2. For example, the factor module 502 can determine the weather condition 244 of the geographic location 206, the geographic area 220, the road segment 224, or a combination thereof. More specifically as an example, the factor module 502 can determine the weather condition 244 based on receiving the weather information from external source 324 including a government entity, a third party information provider such as a media outlet, other users of the navigation system 100, or a combination thereof. As a result, the factor module 502 can determine whether the weather condition 244 includes sunny, cloudy, rainy, foggy, windy, stormy, cold, mild, hot, hail, snow, or a combination thereof.

The factor module 502 can determine the context factor 202 representing the travel distance 248 of FIG. 2. For example, the factor module 502 can determine the travel distance 248 based on calculating the physical distance of the road segment 224 between one instance of the geographic location 206 and another instance of the geographic location 206.

The factor module 502 can determine the context factor 202 representing the safety level 268 of FIG. 2. For example, the factor module 502 can determine the safety level 268 of the geographic location 206, the geographic area 220, the road segment 224, the traffic condition 242 the travel type 228, the travel mode 238, the activity history 266, or a combination thereof.

More specifically as an example, the activity history 266 can indicate the safety level 268 in the past for the geographic location 206, the geographic area 220, the road segment 224, the traffic condition 242 the travel type 228, the travel mode 238, or a combination thereof. Based on the activity history 266, the factor module 502 can extrapolate the safety level 268 for the geographic location 206, the geographic area 220, the road segment 224, the traffic condition 242 the travel type 228, the travel mode 238, or a combination thereof.

For further example, the factor module 502 can determine the safety level 268 of the geographic location 206, the geographic area 220, the road segment 224, or a combination thereof. More specifically as an example, the factor module 502 can determine the safety level 268 based on receiving the safety information from external source 324 including a government entity, a third party information provider such as a media outlet, other users of the navigation system 100, or a combination thereof.

For another example, the factor module 502 can determine the safety level 268 based on meeting or exceeding the safety threshold 270 of FIG. 2. More specifically as an example, the factor module 502 can determine the safety level 268 to be dangerous if the safety level 268 is below the safety threshold 270. In contrast, the factor module 502 can determine the safety level 268 to be safe if the safety level 268 meets or exceeds the safety threshold 270. As a result, the factor module 502 can determine whether the safety level 268 is dangerous, travel with care, safe, or a combination thereof.

For another example, the factor module 502 can determine the context factor 202 representing the user profile 272 of FIG. 2 based on the activity history 266, the user entry 314, or a combination thereof. For example, the factor module 502 can determine the user profile 272 of the passenger based on the capturing device 318 of FIG. 3 detecting each person in the vehicle using an image recognition algorithm. For example, the capturing device 318 can capture the image of the passenger and compare to the image stored in the external source 324, the first storage unit 414, the second storage unit 446, or a combination thereof with the image recognition algorithm.

For another example, the user entry 314 can indicate the user profile 272 as person with a disability such as blindness, hearing impaired, or a combination thereof. The activity history 266 can indicate that the user enjoys listening to classical music over pop music. As a result, the factor module 502 can determine whether the passenger is an adult, children, family member, friend, stranger, with a disability, or a combination thereof.

For a different example, the factor module 502 can determine the context factor 202 representing the travel goal 274 based on the geographic location 206, the travel type 228, the travel itinerary 236, or a combination thereof. For example, the factor module 502 can determine the travel goal 274 of entertaining the children based on the target destination 214 representing the Disney™ store. For a different example, the factor module 502 can determine the travel goal 274 of learning history based on the travel itinerary 236 of the tour travel 234 listing sightseeing stops in Washington D.C.

One instance of the context factor 202 can represent an input to determine another instance of the context factor 202. For example, the factor module 502 can determine one of the context factor 202 based on considering various combination of each instance of the context factor 202 as discussed above. The factor module 502 can transmit the context factor 202 to a context module 504.

The navigation system 100 can include the context module 504, which can be coupled to the factor module 502. The context module 504 determines the travel context 204. For example, the context module 504 can determine the travel context 204 based on the context factor 202 or combination of various instances of the context factor 202.

The context module 504 can determine the travel context 204 in a number of ways. For example, the context module 504 can determine the travel context 204 based on the geographic area 220, the geographic location 206, the road class 226, the traffic condition 242, the travel type 228, the time of travel 254, or a combination thereof. The traffic condition 242 can represent heavy traffic on the road class 226 representing a freeway in the geographic area 220 representing Los Angeles, Calif. The travel type 228 can represent the user with first device 102 is traveling from the work location 210 to the home location 208 after work. The time of travel 254 can represent 6 pm. Based on various combinations of multiple instances of the context factor 202 as discussed above, the context module 504 can determine the travel context 204 representing that the user is stuck in traffic going home after work.

For a different example, the context module 504 can determine the travel context 204 based on the travel type 228 representing the tour travel 234, the travel itinerary 236, or a combination thereof. For example, the travel itinerary 236 can include stopping by multiple tourist stops as the point of interest 216 in the geographic area 220 representing Washington D.C. Based on various combinations of multiple instances of the context factor 202 as discussed above, the context module 504 can determine the travel context 204 representing that the user with the first device 102 is touring in Washington D.C.

For another example, the start location 212 can represent Santa Monica, Calif. and the target destination 214 can represent Grandmother's house in Kansas City, Mo. The road class 226 of the road segment 224 can represent Route 66. The pass by 256 can include the point of interest 216 representing the Grand Canyon. Based on various instances of the context factor 202, the context module 504 can determine the travel context 204 to represent that the user with the first device 102 is traveling through the Southern side of the United States to visit the Grandmother's place.

The context module 504 can factor various combinations of multiple instances of the context factor 202 as an input to determine the travel context 204. The context module 504 can transmit the travel context 204 to a meta module 506.

The navigation system 100 can include the meta module 506, which can be coupled to the context module 504. The meta module 506 generates the content metadata 312 of FIG. 3. For example, the meta module 506 can generate the content metadata 312 based on the media content 310 of FIG. 3, the user entry 314, the external source 324, or a combination thereof.

The meta module 506 can generate the content metadata 312 in a number of ways. For example, the meta module 506 can generate the content metadata 312 based on media content 310 representing a lyrics of the song. More specifically as an example, the meta module 506 can generate the content metadata 312 dynamically in real time based on an algorithm for audio analysis and audio-based music information retrieval such as Essential™.

Moreover, dynamically can represent a continuous change in a situation. For example, the travel context 204 can change dynamically as the user of the first device 102 travels from one of the geographic location 206 to another instance of the geographic location 206. Real time can represent a time frame of current time, happening at this moment, immediately after an execution of a process by the first control unit 412 of FIG. 4 or the second control unit 434 of FIG. 4, or a combination thereof. For example, the current location 218 of the first device 102 can be tracked in real time to determine the geographic location 206 of the first device 102 within the geographic area 220.

The meta module 506 can generate the content metadata 312 corresponding to the context factor 202 within the travel context 204. More specifically as an example, the meta module 506 can generate the content metadata 312 based on extracting a corresponding instance of the context factor 202 from the media content 310.

For example, the meta module 506 can generate the content metadata 312 based on extracting the name of the point of interest 216, the characteristic of the geographic location 206, or a combination thereof from the media content 310 representing the lyrics using the algorithm discussed above. The name of the point of interest 216, the characteristic of the geographic location 206, or a combination can representing the corresponding instance of the context factor 202. For further example, the meta module 506 can generate the content metadata 312 based on extracting the city name of the geographic location 206, the type of the category of interest 222, or a combination thereof from the media content 310 representing mp3tag with the algorithm discussed above.

For another example, the meta module 506 can generate the content metadata 312 based on the user entry 314 made by other users of the navigation system 100, the external source 324 such as a social networking site, or a combination thereof regarding media content 310 representing a song for particular instance of the travel context 204. The user entry 314 can indicate whether a particular song is good or not for the travel context 204. For further example, the user entry 314 can represent a web search regarding the song to drive in the travel context 204.

For another example, the meta module 506 can generate the content metadata 312 based on the external source 324. The external source 324 can represent AcousticBrainz project. The external source 324 can include the media content 310 including musical characteristic such as key, scale, beats per minute, danceability score, or a combination thereof. The algorithm discussed above can calculate the danceability score based on detrended fluctuation analysis. The meta module 506 can transmit the content metadata 312 to a content module 508.

The navigation system 100 can include the content module 508, which can be coupled to the meta module 506. The content module 508 generates the delivery content 304 of FIG. 3. For example, the content module 508 can generate the delivery content 304 based on the content metadata 312, the travel context 204, the user profile 272, or a combination thereof.

The content module 508 can generate the delivery content 304 in a number of ways. For example, the content module 508 can generate the delivery content 304 based on the travel context 204. More specifically as an example, the geographic location 206 can represent Memphis, Tenn. The content metadata 312 can include the lyrics regarding the geographic location 206. The content module 508 can generate the delivery content 304 representing "Graceland" by Paul Simon based the geographic location 206, the content metadata 312, or a combination thereof. More specifically as an example, the song called "Graceland" can include Memphis, Tenn. in the lyrics. If the geographic location 206 detected is Key West, Fla., the content module 508 can generate the delivery content 304 representing "A Pirate Looks at Forty" by Jimmy Buffett.

For further example, the content module 508 can generate the delivery content 304 representing the "Little Deuce Coupe" by the Beach Boys based on the travel context 204 representing traveling along the ocean coast as the content metadata 312 of the song can include lyrics relevant to the travel context 204. In contrast, the content module 508 can generate the delivery content 304 representing "White Walls" by Macklemore based on the travel context 204 representing traveling in the geographic area 220 representing an urban megacity as the content metadata 312 of the song can include lyrics relevant to the travel context 204.

For a different example, the content module 508 can generate the delivery content 304 based on the content metadata 312 representing the geographic location 206 where the singer, band, or a combination thereof is from. The travel context 204 can represent that the user with the first device 102 is travelling in San Francisco, Calif. The content metadata 312 can indicate that the band called Jefferson Airplane is from San Francisco. The content module 508 can generate the delivery content 304 representing a song by the Jefferson Airplane when the user is traveling in San Francisco.

For further example, the content module 508 can generate the delivery content 304 based on the target destination 214 where the user is heading to. The target destination 214 can represent a gym. Based on the travel context 204, the content metadata 312, or a combination thereof, the content module 508 can generate the delivery content 304 representing with a pumping beat and high beats-per-minute with a high danceability score such as "Shake Me" by Mint Royale as the content metadata 312 of the song can include beat relevant to the travel context 204.

For another example, the content module 508 can generate the delivery content 304 based on the road class 226, the content metadata 312, or a combination thereof. For example, the road class 226 traveled by the user of the first device 102 can represent a freeway. Based on the travel context 204, the content metadata 312, or a combination thereof, the content module 508 can generate the delivery content 304 representing "Turn the Page" by Bob Seger as the content metadata 312 of the song can include lyrics relevant to the travel context 204.

For a different example, the road class 226 traveled by the user of the first device 102 can represent a secondary street or an arterial road. Based on the travel context 204, the content metadata 312, or a combination thereof, the content module 508 can generate the delivery content 304 representing "All I Wanna Do" by Sheryl Crow as the content metadata 312 of the song can include lyrics relevant to the travel context 204. For another example, the road class 226 traveled by the user of the first device 102 can represent a residential street. Based on the travel context 204, the content metadata 312, or a combination thereof, the content module 508 can generate the delivery content 304 representing "Home Sweet Home" by Motley Crue as the content metadata 312 of the song can include lyrics relevant to the travel context 204.

For further example, the road class 226 traveled by the user of the first device 102 can represent a sidewalk. Based on the travel context 204, the content metadata 312, or a combination thereof, the content module 508 can generate the delivery content 304 representing "Boots Were Made for Walking" by Nancy Sinatra as the content metadata 312 of the song can include lyrics relevant to the travel context 204.

For another example, the content module 508 can generate the delivery content 304 based on the traffic condition 242, the content metadata 312, or a combination thereof. The traffic condition 242 can represent heavy traffic. The content metadata 312 can include lyrics relevant to the traffic condition 242. Based on the travel context 204, the content metadata 312, or a combination thereof, the content module 508 can generate the delivery content 304 representing "Stuck in the middle with you" by Stealers Wheel as the content metadata 312 of the song can include lyrics relevant to the travel context 204. For a different example, the traffic condition 242 can represent construction on the road segment 224. The content metadata 312 can include lyrics relevant to the traffic condition 242. Based on the travel context 204, the content metadata 312, or a combination thereof, the content module 508 can generate the delivery content 304 representing "Under construction" by Solange Knowles as the content metadata 312 of the song can include lyrics relevant to the travel context 204.

For another example, the content module 508 can generate the delivery content 304 based on the geographic location 206, the content metadata 312, or a combination thereof. The geographic location 206 can represent the home location 208 or the work location 210. The content metadata 312 can include profane language in the lyrics. Based on the geographic location 206, the content metadata 312, or a combination thereof, the content module 508 can generate the delivery content 304 representing the edited version without the profane language when the user is at the work location 210 while generating the unedited version including the profane language when the user is at the home location 208. Continuing with the example, the content module 508 can generate the delivery content 304 representing the edited version without lyrics at the work location 210 to allow better concentration by the user while generating the unedited version including the lyrics for the home location 208.

For another example, the content module 508 can generate the delivery content 304 based on the travel type 228, the content metadata 312, or a combination thereof. The travel type 228 can represent the work travel 232 from the home location 208 to the work location 210. Based on the travel context 204, the content metadata 312, or a combination thereof, the content module 508 can generate the delivery content 304 representing "We are the Champions" by Queen as the content metadata 312 of the song can include lyrics relevant to the travel context 204.

In contrast, the travel type 228 can represent the personal travel 230 from the work location 210 to the home location 208. Based on the travel context 204, the content metadata 312, or a combination thereof, the content module 508 can generate the delivery content 304 representing "What a Wonderful World" by Louis Armstrong as the content metadata 312 of the song can include lyrics relevant to the travel context 204.

For another example, the content module 508 can generate the delivery content 304 based on the travel mode 238, the vehicle type 240, the content metadata 312, or a combination thereof. The travel mode 238 can represent the travel by an automobile with the vehicle type 240 of non-autonomous vehicle. Based on the travel context 204, the content metadata 312, or a combination thereof, the content module 508 can generate the delivery content 304 representing "Life is a Highway" by Tom Cochrane as the content metadata 312 of the song can include lyrics relevant to the travel context 204.

For another example, the content module 508 can generate the delivery content 304 based on the pass by 256, or a combination thereof. The travel context 204 can indicate that the pass by 256 performed by the user with the first device 102 represents user is passing by a railroad track. Based on the travel context 204, the content metadata 312, or a combination thereof, the content module 508 can generate the delivery content 304 representing "Orange Blossom Special" by Johnny Cash as the content metadata 312 of the song can include lyrics relevant to the travel context 204.

For a different example, the travel context 204 can indicate that the pass by 256 performed by the user with the first device 102 represents user is passing by a river. Based on the travel context 204, the content metadata 312, or a combination thereof, the content module 508 can generate the delivery content 304 representing "The water is wide," a folk song, as the content metadata 312 of the song can include lyrics relevant to the travel context 204.

For another example, the content module 508 can generate the delivery content 304 based on the geographic proximity 258, or a combination thereof. The travel context 204 can indicate that the user with the first device 102 is within the geographic proximity 258 of the point of interest 216 representing Harley Davidson, a motorcycle dealership. Based on the travel context 204, the content metadata 312, or a combination thereof, the content module 508 can generate the delivery content 304 representing "Motorcycle" by Love and Rockets as the content metadata 312 of the song can include lyrics relevant to the travel context 204.

For a different example, the travel context 204 can indicate that the user with the first device 102 is within the geographic proximity 258 of the point of interest 216 representing Olive Garden, an Italian cuisine restaurant. Based on the travel context 204, the content metadata 312, or a combination thereof, the content module 508 can generate the delivery content 304 representing "That's Amore" by Dean Martin as the content metadata 312 of the song can include lyrics relevant to the travel context 204.

For a different example, the travel context 204 can indicate that the user with the first device 102 is within the geographic proximity 258 of the point of interest 216 representing Woodstock, N.Y. The activity history 266 can indicate that user had attended a music festival in Woodstock in the past and saw Jimi Hendrix, a musician. Based on the travel context 204, the activity history 266, the content metadata 312, or a combination thereof, the content module 508 can generate the delivery content 304 representing music by Jimi Hendrix when the user is within the geographic proximity 258.

For another example, the content module 508 can generate the delivery content 304 based on the event proximity 262, or a combination thereof. The travel context 204 can indicate that the user with the first device 102 is within the event proximity 262 of the category of interest 222 representing a music festival such as Monterey Pop Music Festival in Monterey, Calif. The content metadata 312 can indicate that Joan Baez, a musician, has ties to Monterey. Based on the travel context 204, the content metadata 312, or a combination thereof, the content module 508 can generate the delivery content 304 representing music by Joan Baez when the user is within the event proximity 262.

For a different example, the travel context 204 can indicate that the user with the first device 102 is within the event proximity 262 of the category of interest 222 representing a baseball game. Based on the travel context 204, the content metadata 312, or a combination thereof, the content module 508 can generate the delivery content 304 representing "Centerfield" by John Fogerty as the content metadata 312 of the song can include lyrics relevant to the travel context 204.

The content module 508 can generate different types of the delivery content 304. For example, the content module 508 can generate the delivery content 304 including the primary content 306 of FIG. 3, the secondary content 308 of FIG. 3, or a combination thereof.

For a specific example, the content module 508 can generate the delivery content 304 based on the media content 310 provided by the external source 324. More specifically as an example, the external source 324 can include music streaming provider such as Pandora™, Spotify™, Apple Music™, Rdio™, Google Play Music™, or a combination thereof. For a different example, the content module 508 can generate the delivery content 304 based on the media content 310 stored on the first storage unit 414, the second storage unit 446, or a combination thereof.

For further example, the content module 508 can generate the delivery content 304 based on the user entry 314 captured by the capturing device 318. The capturing device 318 can track the physiological information of the user of the first device 102. For a specific example, the travel context 204 can represent the user is operating the vehicle in a mountainous road where the road segment 224 includes multiple sections of the hairpin curve. The capturing device 318 can detect that the heartrate of the user, as an implicit instance of the user entry 314, is above the average heart rate of the user according to the activity history 266. Based on the travel context 204 and the user entry 314 from the capturing device 318, the content module 508 can generate the delivery content 304 representing music with a tempo that is slower than the tempo of Adagio.

For further example, the content module 508 can generate the primary content 306, the secondary content 308, or a combination thereof based on the user profile 272, the travel context 204, or a combination thereof. The user profile 272 can indicate the user's preference in the media content 310 for a particular instance of the travel context 204. As a result, the content module 508 can generate the delivery content 304 that matches with the user's preference for the travel context 204 as the primary content 306 to be delivered to the user. In contrast, the content module 508 can generate the delivery content 304 that does not match with the user's preference for the travel context 204 as the secondary content 308.

For a different example, the content module 508 can generate the primary content 306 based on the geographic location 206, the geographic area 220, or a combination thereof. The travel context 204 can indicate that the user is on the tour travel 234 with the travel itinerary 236 of visiting multiple instances of the point of interest 216 representing landmarks in Washington D.C. The content module 508 can generate the primary content 306 representing the information regarding each of the point of interest 216 for the travel itinerary 236.

Continuing with the example, the content module 508 can generate the primary content 306 as the general information regarding the landmark. The content module 508 can generate the secondary content 308 based on the user profile 272, the travel context 204, or a combination thereof to tailor the delivery content 304 for the user visiting the point of interest 216. For example, the user profile 272 can indicate that the user is interested in history behind the point of interest 216. The content module 508 can generate the secondary content 308 including history information regarding the point of interest 216 not included in the primary content 306.

For additional example, the content module 508 can generate the secondary content 308 to supplement the primary content 306 based on the travel context 204. More specifically as an example, the primary content 306 can represent an audio content including the information regarding the point of interest 216. The travel context 204 can indicate that the user has plenty of time to spare. The content module 508 can generate the secondary content 308 representing a visual content regarding the point of interest 216 to supplement the audio content of the primary content 306.

For further example, the content module 508 can generate the secondary content 308 to replace the primary content 306 based on the travel context 204. More specifically as an example, the travel context 204 can indicate that the user is behind in the travel itinerary 236. The content module 508 can generate the secondary content 308 representing a blank content to replace the primary content 306 if the user arrives at the point of interest 216 late and to shorten the visit at the point of interest 216 by the user. The content module 508 can transmit the delivery content 304 to a sequence module 510.

The navigation system 100 can include the sequence module 510, which can be coupled to the content module 508. The sequence module 510 generates the delivery sequence 302 of FIG. 3. For example, the sequence module 510 can generate the delivery sequence 302 based on the delivery content 304, the travel context 204, the user profile 272, or a combination thereof.

The sequence module 510 can generate the delivery sequence 302 in a number of ways. For example, the traffic condition 242 can represent a traffic jam thus the vehicles on the road segment 224 can be traveling below the speed limit. Based on the traffic condition 242, the sequence module 510 can generate the delivery sequence 302 including an instance or multiple instances of the delivery content 304 including the media content 310 representing music with a slower tempo than the tempo of Andante. In contrast, if the traffic condition 242 is a free flow, the sequence module 510 can generate the delivery sequence 302 including an instance or multiple instances of the delivery content 304 including the media content 310 representing music with a faster tempo than the tempo of Andante.

For a different example, the sequence module 510 can generate the delivery sequence 302 based on the travel context 204 indicating the user's arrival at the target destination 214. The sequence module 510 can generate the delivery sequence 302 including multiple instances of the delivery content 304 with one instance of the delivery content 304 specifically to be presented to the user when the travel time 250 of FIG. 2 to the target destination 214 meets or within the remaining time threshold 252 of FIG. 2. For example, if the remaining time threshold 252 is two minutes and the travel time 250 is two minutes, the sequence module 510 can generate the delivery sequence 302 with one of the delivery content 304 representing an announcement to the user that user should prepare for the arrival to the target destination 214.

For a different example, the sequence module 510 can generate the delivery sequence 302 based on the travel context 204, the user profile 272, or a combination thereof for enhancing the user's mood. The travel context can be traveling in the geographic area 220 representing a mountainous region with the road segment 224 including curvy sections. The user profile 272 can indicate that the user is a racecar driver and enjoys driving fast. Based on the travel context 204, the user profile 272, the sequence module 510 can generate the delivery sequence 302 including multiple instances of the delivery content 304 having the tempo faster than the tempo of Vivace for enhancing the user's mood.

For further example, the travel context 204 can represent the personal travel 230 in a safari park. As a result, the sequence module 510 can generate the delivery sequence 302 with instances of the delivery content 304 including a theme song of a musical, "Lion King," when the user with the first device 102 is at the point of interest 216 representing the safari park for enhancing the user's mood. For another example, the sequence module 510 can generate the delivery sequence 302 with instances of the delivery content 304 with the media content 310 of a minor key scale if the geographic area 220 traveled is an industrial area for lowering the user's mood. In contrast, the sequence module 510 can generate the delivery sequence 302 with instances of the delivery content 304 with the media content 310 of a major key scale if the pass by 256 traveled is within the geographic proximity 258 of the point of interest 216 representing a lake for enhancing the user's mood.

It has been discovered that the navigation system 100 generating the delivery sequence 302 based on the travel context 204, the user profile 272, or a combination thereof improves the efficiency and accuracy of executing the delivery of the delivery content 304 by the first control unit 412, the second control unit 424, or a combination thereof. By factoring the travel context 204, the navigation system 100 can generate the delivery sequence 302 arranged in an order most suited for the travel context 204 traveled by the user. As a result, the navigation system 100 can deliver the delivery content 304 most relevant to the user profile 272 for the safer operation of the first device 102, the vehicle, computing system 100.

For a different example, the sequence module 510 can generate the delivery sequence 302 based on the category of interest 222 of the point of interest 216. More specifically as an example, the delivery sequence 302 can include the delivery content 304 that matches the category of interest 222. For example, the delivery content 304 can represent an advertisement for the point of interest 216 with the category of interest 222 representing an Italian restaurant. The delivery sequence 302 can be arranged in the order so that the timing of the presentation of the advertisement will be at when the remaining instance of the travel time 250 to the point of interest 216 matches the content duration 316 of FIG. 3 of the advertisement. The point of interest 216 can be the restaurant or the billboard advertisement of the restaurant.

Continuing with the example, the delivery sequence 302 can be arranged so that the delivery content 304 previous to the advertisement will finish presenting before the timing that the advertisement will be presented as discussed above. Moreover, the sequence module 510 can generate the delivery sequence 302 to include the delivery content 304, previous to the advertisement, with the media content 310 related to the category of interest 222. More specifically as an example, the delivery content 304 representing a song called "That's Amore" can be selected based on the content metadata 312 of the song to match the category of interest 222 of an Italian restaurant. As a result, the sequence module 510 can generate the delivery sequence 302 to include the song "That's Amore" followed by the advertisement to be presented to the user before arriving to the point of interest 216.

It has been discovered that the navigation system 100 generating the delivery sequence 302 based on the category of interest 222, the content duration 316, or a combination thereof improves the efficiency and accuracy of executing the delivery of the delivery content 304 by the first control unit 412, the second control unit 424, or a combination thereof. By factoring the category of interest 222, the content duration 316, or a combination thereof, the navigation system 100 can generate the delivery sequence 302 to be delivered at the best timing for the travel context 204 traveled by the user. As a result, the navigation system 100 can deliver the delivery content 304 most relevant to the category of interest and the point of interest 216 for the safer operation of the first device 102, the vehicle, computing system 100.

For a different example, the sequence module 510 can generate the delivery sequence 302 based on the safety level 268 of the travel context 204, the user profile 272, the delivery content 304, or a combination thereof. The travel context 204 can represent traveling through the mountainous region as discussed above. The safety level 268 can be below the safety threshold 270, thus the travel context 204 can represent dangerous. The user profile 272 can indicate that user is familiar with the music from the 1990s in the United States. Based on the safety level 268, the user profile, the sequence module 510 can generate the delivery sequence 302 with multiple instances of the delivery content 304 including songs from 1990s in the United States to increase familiarity and decrease unknown from traveling in stressful condition.

For a different example, the sequence module 510 can generate the delivery sequence 302 to exclude the delivery content 304 representing an advertisement when the safety level 268 is below the safety threshold 270. For another example, the sequence module 510 can generate the delivery sequence 302 to replace the primary content 306 with the secondary content 308 representing silent content when the safety level 268 is below the safety threshold 270. Moreover, the sequence module can generate the delivery sequence 302 with one of the delivery content 304 representing an announcement to notify the user that the delivery content 304 representing an audio content or a visual content will be suspended and be replaced with the secondary content 308 when the safety level 268 is below the safety threshold 270.

It has been discovered that the navigation system 100 generating the delivery sequence 302 based on the safety level 268 improves the efficiency and accuracy of executing the delivery of the delivery content 304 by the first control unit 412, the second control unit 424, or a combination thereof. By factoring the safety level 268, the navigation system 100 can generate the delivery sequence 302 to deliver the delivery content 304 most safe for the travel context 204 traveled by the user. As a result, the navigation system 100 can deliver the delivery content 304 most relevant to the user profile 272 for the safer operation of the first device 102, the vehicle, computing system 100.

For another example, the sequence module 510 can generate the delivery sequence 302 based on the user profile 272, the delivery content 304, or a combination thereof. More specifically as an example, the vehicle can include variety of passengers with each of the user profile 272 being unique. The sequence module 510 can generate multiple instances of the delivery sequence 302 for each of the user profile 272 where the passengers are traveling together in the same instance of the travel context 204.

For a specific example, the each passenger can operate his or her own instance of the first device 102. All of the passengers are in the same vehicle traveling together on the personal travel 230, the work travel 232, or the tour travel 234. The sequence module 510 can generate multiple instances of the delivery sequence 302 tailored to each of the user profile 272 traveling together on the personal travel 230, the work travel 232, or the tour travel 234.

Continuing with the example, the target destination 214 of the personal travel 230 can represent Broadway in Manhattan, N.Y. The passengers in the vehicle can include the mother, father, son, and daughter. The two children can be under the age of 7. The vehicle can include multiple screens representing the first device 102 for the children to view the delivery content 304. The sequence module 510 can generate the delivery sequence 302 including multiple instances of the delivery content 304 for the children. More specifically as an example, the delivery sequence 302 can include various Broadway hits including songs from "Lion King," "Frozen," "The Phantom of the Opera," or a combination thereof for presenting on the first device 102 of the children.

In contrast, the sequence module 510 can generate the delivery sequence 302 tailored to the parents in the personal travel 230 and different from the delivery sequence 302 generated for the children. More specifically as an example, the delivery sequence 302 can include the delivery content 304 representing various advertisements for the category of interest 222, the point of interest 216, or a combination thereof.

For further example, since there are children in the vehicle, the sequence module 510 can avoid generating the delivery sequence 302 unsuited for the children. For example, the sequence module 510 can generate the delivery sequence 302 excluding the delivery content 304 unsuited for a minor such as the audio content with profanity, the visual content with sexual content, or a combination thereof. Moreover, the delivery content 304 relating to sweets such as ice cream can be excluded from the delivery sequence 302 to avoid instigating the children.

It has been discovered that the navigation system 100 generating multiple instances of the delivery sequence 302 based on the travel context 204, the user profile 272, or a combination thereof improves the efficiency and accuracy of executing the delivery of the delivery content 304 by the first control unit 412, the second control unit 424, or a combination thereof. By factoring each of the user profile 272, the navigation system 100 can generate the delivery sequence 302 including the delivery content 304 most relevant for each of the user within the travel context 204. As a result, the navigation system 100 can deliver the delivery content 304 most relevant to the user profile 272 for the safer operation of the first device 102, the vehicle, computing system 100.

The sequence module 510 can generate the delivery sequence 302 including the itinerary-centric sequence 320 of FIG. 3, the goal-centered sequence 322 of FIG. 3, or a combination thereof. For example, the sequence module 510 can generate the itinerary-centric sequence 320 based on the travel itinerary 236, the travel context 204, the delivery content 304, or a combination thereof. More specifically as an example, the sequence module 510 can generate the itinerary-centric sequence 320 by arranging multiple instances of the delivery content 304 in the order of the multiple instances of the geographic location 206 scheduled in the travel itinerary 236.

For further example, as the user travels on the tour travel 234 and the travel time 250 between one of the geographic location 206 to another of the geographic location 206 fluctuates, the content duration 316 of one of the delivery content 304 can overlap the content duration 316 of the subsequent instance of the delivery content 304. The sequence module 510 can generate the itinerary-centric sequence 320 by fading out the previous instance of the delivery content 304 and fading in the subsequent instance of the delivery content 304 when there is an overlap between the two instances of the delivery content 304 scheduled to be presented one after another.

For additional example, the delay in the tour travel 234 can extend the travel time 250 between one of the geographic location 206 to another of the geographic location 206. Further, the delay can extend the travel time 250 longer than the content duration 316 of the delivery content 304 scheduled to be presented. The sequence module 510 can generate the itinerary-centric sequence 320 by adding the secondary content 308 to fill a gap between the multiple instances of the delivery content 304. The secondary content 308 can represent additional information regarding the geographic location 206, the geographic area 220, the point of interest 216, the category of interest 222, or a combination thereof. For a different example, the secondary content 308 can represent an advertisement, a silent content, or a combination thereof.

It has been discovered that the navigation system 100 generating the itinerary-centric sequence 320 based on the travel context 204, the user profile 272, or a combination thereof improves the efficiency and accuracy of executing the delivery of the delivery content 304 by the first control unit 412, the second control unit 424, or a combination thereof. By factoring the change in the travel itinerary 236, the navigation system 100 can generate the itinerary-centric sequence 320 arranged in an order most suited for the travel context 204 traveled by the user. As a result, the navigation system 100 can deliver the delivery content 304 most relevant to the user profile 272 for the safer operation of the first device 102, the vehicle, computing system 100.

For a different example, the sequence module 510 can generate the goal-centered sequence 322 based on the travel goal 274, the travel context 204, the delivery content 304, or a combination thereof. For example, the travel goal 274 can represent entertaining the children. The sequence module 510 can generate the goal-centered sequence 322 to include multiple instances of the delivery content 304 tailored to the travel goal 274.

More specifically as an example, the travel goal 274 can represent going to the Disney™ store. The sequence module 510 can generate the goal-centered sequence 322 based on the travel goal 274 to include instances of the delivery content 304 relevant to the category of interest 222 representing the Disney™ brand including advertisement, audio content, visual content, or a combination thereof. For further example, the travel context 204 can indicate that a park is within the geographic proximity 258 of the Disney™ store. The user profile 272 can indicate that the children enjoy flying kite. The goal-centered sequence 322 can include instances of the delivery content 304 including a song such as "Let's Go Fly A Kite" from the Disney™ musical "Mary Poppins," the advertisement for purchasing kite at the Disney™ store, information on flying kite at the park, or a combination thereof "Let's Go Fly A Kite" can be played before the advertisement, played with the information on flying kite to augment the experience, or a combination thereof.

For further example, the sequence module 510 can generate the delivery sequence 302 including the goal-centered sequence 322 based on dynamically matching the delivery content 304 to the point of interest 216 in real time. The travel goal 274 can represent learning about history of Washington D.C. The sequence module 510 can generate the delivery sequence 302 to present the delivery content 304 relevant to the point of interest 216 when the current location 218 is detected within the geographic proximity 258, the event proximity 262, or a combination thereof. For further example, the sequence module 510 can generate the delivery sequence 302 to present the delivery content 304 relevant to the point of interest 216 when the travel time 250 to the point of interest 216 meets or within the remaining time threshold 252.

It has been discovered that the navigation system 100 generating the goal-centered sequence 322 based on the travel context 204, the user profile 272, or a combination thereof improves the efficiency and accuracy of executing the delivery of the delivery content 304 by the first control unit 412, the second control unit 424, or a combination thereof. By factoring the travel goal 274, the navigation system 100 can generate the goal-centered sequence 322 arranged in an order most suited for the travel context 204 traveled by the user. As a result, the navigation system 100 can deliver the delivery content 304 most relevant to the user profile 272 for the safer operation of the first device 102, the vehicle, computing system 100.

Continuing with the example, the sequence module 510 can generate multiple instances of the itinerary-centric sequence 320, the goal-centered sequence 322, or a combination thereof for multiple passengers traveling together in the same instance of the travel context 204 with each having a different makeup of the user profile 272. For example, the passengers can include the parents and the children traveling together.

The sequence module 510 can generate multiple instances of the itinerary-centric sequence 320, the goal-centered sequence 322, or a combination thereof for each of the user profile 272. For example, the travel context 204 can represent the tour travel 234 in Washington D.C. The sequence module 510 can generate one of the delivery sequence 302 more tailored to the children by providing the delivery content 304 including media content 310 with vocabulary tailored for the children's age. In contrast, the sequence module 510 can generate another of the delivery sequence 302 more tailored to the parents by providing the delivery content 304 including media content 310 with vocabulary tailored for the parent's age. Each of the delivery sequence 302 with the delivery content 304 can be presented to the first device 102 registered for the user profile 272. The sequence module 510 can transmit the delivery sequence 302 to a presentation module 512, an update module 514, or a combination thereof.

The navigation system 100 can include the presentation module 512, which can be coupled to the sequence module 510. For example, the presentation module 512 can present the delivery sequence 302 including the delivery content 304 to the first device 102. More specifically as an example, the presentation module 512 can present the delivery sequence 302 including the delivery content 304 to multiple devices each representing different type of the first device 102.

For example, each passenger traveling together can operate different instances of the first device 102. One instance of the first device 102 can represent a mobile device representing a smartphone. Another instance of the first device 102 can represent a screen installed in the vehicle. Each devices of the first device 102 can be operated by a passenger with unique instance of the user profile 272. The presentation module 512 can present the delivery sequence 302 to the first device 102 based on the user profile 272 registered to the first device 102. The presentation module 512 can present the delivery content 304 in audio format, visual format, or a combination thereof.

The navigation system 100 can include the update module 514, which can be coupled to the sequence module 510. The update module 514 updates the information presented to the user of the first device 102. For example, the update module 514 can update the travel itinerary 236, the delivery content 304, the delivery sequence 302, or a combination thereof based on the travel context 204, the context factor 202, or a combination thereof.

The update module 514 can update the information in a number of ways. For example, the update module 514 can update the travel itinerary 236 based on the change in the travel context 204. Due to the change in the travel context 204 such as delays, change in the weather condition 244, change in the traffic condition 242, or a combination thereof, the user may not be able to continue with the tour travel 234 without changing the travel itinerary 236. For further example, some of the point of interest 216 can take longer or shorter than anticipated to sightsee. As a result, the update module 514 can update the travel itinerary 236 by adding, removing, or a combination thereof the point of interest 216 from the travel itinerary 236.

More specifically as an example, the update module 514 can remove the point of interest 216 when there is a delay in the current instance of the travel itinerary 236. For a different example, the update module 514 can add the point of interest 216 relevant to the travel itinerary 236 based on the travel context 204, the travel goal 274, the geographic location 206, or a combination thereof. For a specific example, if the travel goal 274 is to learn the history of the Washington D.C., the update module 514 can add the point of interest 216 related to the history of the Washington D.C. that is not on the travel itinerary 236 to the travel itinerary 236.

For further example, the update module 514 can update the travel itinerary 236 in its entirety or partially based on the change in the travel context 204, the context factor 202, or a combination thereof. More specifically as an example, the update module 514 can update the travel itinerary 236 partially based on the change in the road segment 224 traveled thus changing the geographic area 220 traveled. The update module 514 can update the travel itinerary 236 to remove the geographic location 206 on the road segment 224 no longer traveled from the travel itinerary 236. Instead, the update module 514 can update the travel itinerary 236 to add the geographic location 206 on the road segment 224 newly traveled. The update module 514 can update the travel itinerary 236 in its entirety by removing all of the geographic location 206 originally included and replacing with different instances of the geographic location 206 to accommodate the change in the travel context 204.

The update module 514 can update the delivery content 304 based on the change in the travel context 204, the travel itinerary 236, the context factor 202, or a combination thereof. For example, the travel itinerary 236 can change as discussed above. Based on the change in the travel context 204, the update module 514 can update the delivery content 304 to suit the travel context 204 based on the steps similar to the steps as discussed above for generating the delivery content 304. Moreover, the update module 514 can update the delivery content 304 by adding, removing, matching, or a combination thereof the delivery content 304 to suit the travel context 204 where the user of the first device 102 is traveling.

The update module 514 can update the delivery sequence 302 based on the change in the travel context 204, the travel itinerary 236, the context factor 202, or a combination thereof. For example, the travel itinerary 236 can change as discussed above. Based on the change in the travel context 204, the update module 514 can update the delivery sequence 302 to suit the travel context 204 based on the steps similar to the steps as discussed above for generating the delivery sequence 302. Moreover, the update module 514 can update the delivery sequence 302 by adding, removing, matching, or a combination thereof the delivery content 304 to suit the travel context 204 where the user of the first device 102 is traveling.

The physical transformation from determining the travel context 204 based on factoring the context factor 202 results in the movement in the physical world, such as people using the first device 102, the vehicle, or a combination thereof, based on the operation of the navigation system 100. As the movement in the physical world occurs, the movement itself creates additional information that is converted back into further determination of the travel context 204 as the context factor 202 determined or detected changes with the movement in the physical world. Furthermore, the movement in the physical world leads to generation and update of the delivery content 304, the delivery sequence 302, or a combination thereof to reflect the changes in the travel context 204, the context factor 202, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the factor module 502, the context module 504, the meta module 506, the content module 508, the sequence module 510, the presentation module 512, and the update module 514. The first control unit 412 of FIG. 4 can execute the modules to perform the functions dynamically and in real time.

The first control unit 412 can execute the first software 426 for the factor module 502 to determine the context factor 202. The first control unit 412 can execute the first software 426 for the context module 504 to determine the travel context 204. The first control unit 412 can execute the first software 426 for the meta module 506 to generate the content metadata 312.

The first control unit 412 can execute the first software 426 for the content module 508 to generate the delivery content 304. The first control unit 412 can execute the first software 426 for the sequence module 510 to generate the delivery sequence 302. The first control unit 412 can execute the first software 426 for the presentation module 512 to present the delivery sequence 302 including the delivery content 304. The first control unit 412 can execute the first software 426 for the update module 514 to update the travel itinerary 236, the delivery content 304, the delivery sequence 302, or a combination thereof.

The second software 442 of FIG. 4 of the first device 102 of FIG. 4 can include the modules for the navigation system 100. For example, the second software 442 can include the factor module 502, the context module 504, the meta module 506, the content module 508, the sequence module 510, the presentation module 512, and the update module 514. The second control unit 434 of FIG. 4 can execute the modules to perform the functions dynamically and in real time.

The second control unit 434 can execute the second software 442 for the factor module 502 to determine the context factor 202. The second control unit 434 can execute the second software 442 for the context module 504 to determine the travel context 204. The second control unit 434 can execute the second software 442 for the meta module 506 to generate the content metadata 312.

The second control unit 434 can execute the second software 442 for the content module 508 to generate the delivery content 304. The second control unit 434 can execute the second software 442 for the sequence module 510 to generate the delivery sequence 302. The second control unit 434 can execute the second software 442 for the presentation module 512 to present the delivery sequence 302 including the delivery content 304. The second control unit 434 can execute the second software 442 for the update module 514 to update the travel itinerary 236, the delivery content 304, the delivery sequence 302, or a combination thereof.

The modules of the navigation system 100 can be partitioned between the first software 426 and the second software 442. The second software 442 can include the factor module 502, the context module 504, the meta module 506, the content module 508, the sequence module 510, and the update module 514. The second control unit 434 can execute modules partitioned on the second software 442 as previously described.

The first software 426 can include the presentation module 512. Based on the size of the first storage unit 414, the first software 426 can include additional modules of the navigation system 100. The first control unit 412 can execute the modules partitioned on the first software 426 as previously described.

The first control unit 412 can operate the first communication unit 416 of FIG. 4 to transmit the context factor 202, the travel context 204, the content metadata 312, the delivery content 304, the delivery sequence 302, or a combination thereof to or from the second device 106 through the communication path 104 of FIG. 4. The first control unit 412 can operate the first software 426 to operate the location unit 420 of FIG. 4. The second control unit 434 can operate the second communication unit 436 of FIG. 4 to transmit the context factor 202, the travel context 204, the content metadata 312, the delivery content 304, the delivery sequence 302, or a combination thereof to or from the first device 102 through the communication path 104.

The navigation system 100 describes the module functions or order as an example. The modules can be partitioned differently. For example, the content module 508 and the sequence module 510 can be combined. Each of the modules can operate individually and independently of the other modules. Furthermore, data generated in one module can be used by another module without being directly coupled to each other. For example, the content module 508 can receive the travel context 204 from the context module 504. Further, one module transmitting to another module can represent one module communicating, sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
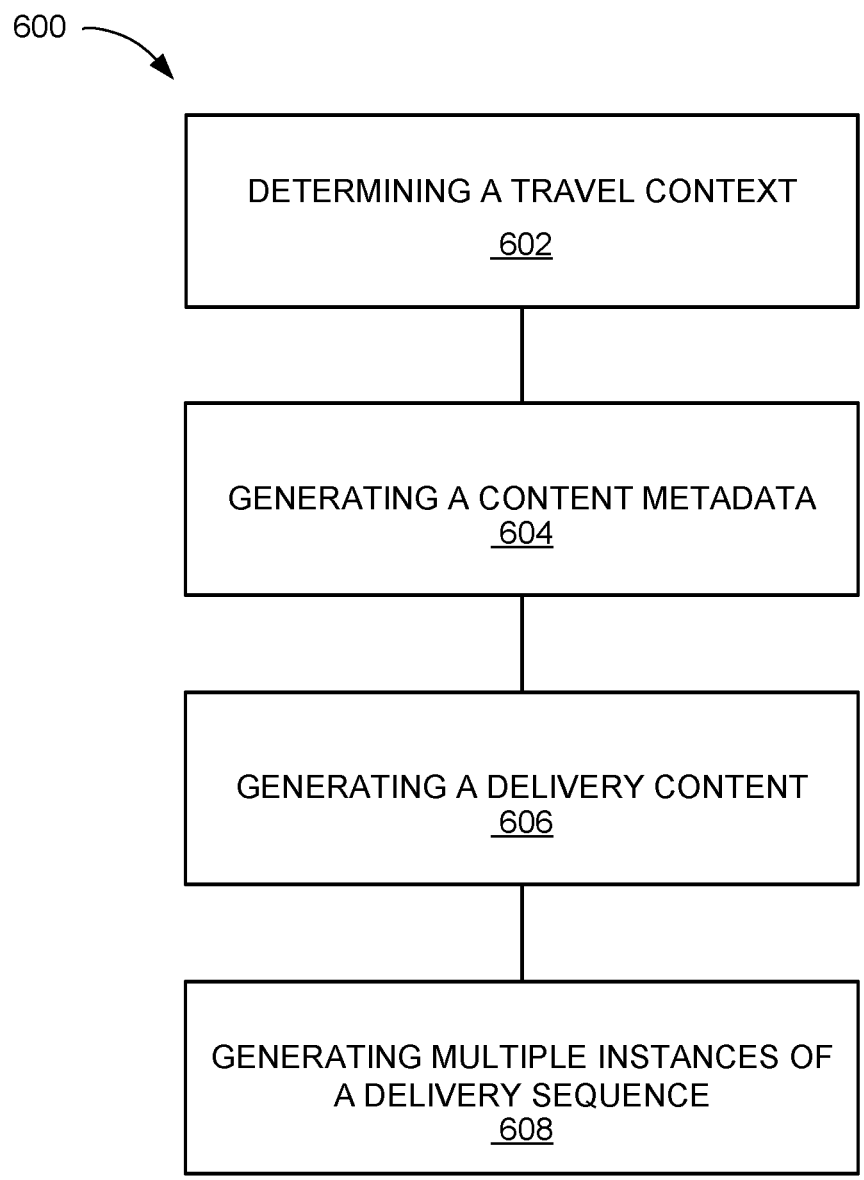
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a travel context with a control unit based on a context factor in a block 602; generating a content metadata based on extracting a corresponding instance of the context factor from a media content in a block 604; generating a delivery content based on the travel context, the content metadata, or a combination thereof for selecting the media content relevant to the travel context in a block 606; and generating multiple instances of a delivery sequence wherein each of the delivery sequence different from one another by including a different instance of the delivery content for tailoring the delivery sequence for each of a user profile traveling together within the travel context for presenting on each of a device of the user profile in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a travel context with a control unit based on a context factor;
   generating a content metadata based on extracting a corresponding instance of the context factor including a type of a category of interest from a media content;
   generating a delivery content based on the travel context, the content metadata, or a combination thereof for selecting the media content relevant to the travel context; and
   generating multiple instances of a delivery sequence wherein each of the delivery sequence different from one another by including a different instance of the delivery content for tailoring the delivery sequence for each of a user profile traveling together within the travel context for presenting on each of a device of the user profile.

2. The method as claimed in claim 1 wherein generating the delivery content includes generating multiple instances of the delivery content including a primary content, a secondary content, or a combination thereof.

3. The method as claimed in claim 1 wherein generating the delivery content includes generating a secondary content based on the travel context for supplementing a primary content.

4. The method as claimed in claim 1 wherein generating the delivery content includes generating a secondary content based on the travel context for replacing a primary content.

5. The method as claimed in claim 1 wherein generating the multiple instances of the delivery sequence includes generating the delivery sequence based on a traffic condition for including the delivery content suited for the user profile, the travel context, or a combination thereof.

6. The method as claimed in claim 1 wherein generating the multiple instances of the delivery sequence includes generating the delivery sequence including the delivery content presented when a content duration of the delivery content matches with a travel time to a geographic location.

7. The method as claimed in claim 1 wherein generating the multiple instances of the delivery sequence includes generating the delivery sequence based on comparing a safety level to a safety threshold for excluding the delivery content unsuited for the travel context.

8. The method as claimed in claim 1 wherein generating the multiple instances of the delivery sequence includes generating an itinerary-centric sequence based on a travel itinerary for arranging multiple instances of delivery content for a travel tour.

9. The method as claimed in claim 1 wherein generating the multiple instances of the delivery sequence includes generating a goal-centered sequence based on a travel goal for tailoring the delivery content relevant to the travel context.

10. The method as claimed in claim 1 further comprising updating a travel itinerary based on a change in the travel context for updating the delivery sequence.

11. A navigation system comprising:
a control unit for:
determining a travel context with a control unit based on a context factor,
generating a content metadata based on extracting a corresponding instance of the context factor including a type of a category of interest from a media content,
generating a delivery content based on the travel context, the content metadata, or a combination thereof for selecting the media content relevant to the travel context,
generating multiple instances of a delivery sequence wherein each of the delivery sequence different from one another by including a different instance of the delivery content for tailoring the delivery sequence for each of a user profile traveling together within the travel context; and
a communication unit, coupled to the control unit, for transmitting the multiple instances of a delivery sequence for presenting on each of a device of the user profile.

12. The system as claimed in claim 11 wherein the control unit is for generating multiple instances of the delivery content including a primary content, a secondary content, or a combination thereof.

13. The system as claimed in claim 11 wherein the control unit is for generating a secondary content based on the travel context for supplementing a primary content.

14. The system as claimed in claim 11 wherein the control unit is for generating a secondary content based on the travel context for replacing a primary content.

15. The system as claimed in claim 11 wherein the control unit is for generating the delivery sequence based on a traffic condition for including the delivery content suited for the user profile, the travel context, or a combination thereof.

16. A non-transitory computer readable medium including instructions for execution, the instructions comprising:
determining a travel context based on a context factor;
generating a content metadata based on extracting a corresponding instance of the context factor including a type of a category of interest from a media content;
generating a delivery content based on the travel context, the content metadata, or a combination thereof for selecting the media content relevant to the travel context; and
generating multiple instances of a delivery sequence wherein each of the delivery sequence different from one another by including a different instance of the delivery content for tailoring the delivery sequence for each of a user profile traveling together within the travel context for presenting on each of a device of the user profile.

17. The non-transitory computer readable medium as claimed in claim 16 wherein generating the delivery content includes generating multiple instances of the delivery content including a primary content, a secondary content, or a combination thereof.

18. The non-transitory computer readable medium as claimed in claim 16 wherein generating the delivery content includes generating a secondary content based on the travel context for supplementing a primary content.

19. The non-transitory computer readable medium as claimed in claim 16 wherein generating the multiple instances of the delivery sequence includes generating the delivery sequence based on a traffic condition for including the delivery content suited for the user profile, the travel context, or a combination thereof.

20. The non-transitory computer readable medium as claimed in claim 16 further comprising determining a restriction level based on comparing the object count to the count threshold.

* * * * *